United States Patent
Gregerson et al.

(10) Patent No.: US 11,253,807 B2
(45) Date of Patent: Feb. 22, 2022

(54) CHANNEL-FRAMED, PLEATED AIR FILTER WITH BRIDGING FILAMENTS

(71) Applicant: 3M INNOVATIVE PROPERTIES COMPANY, St. Paul, MN (US)

(72) Inventors: Glen O. Gregerson, Hudson, WI (US); Jonathan M. Lise, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 289 days.

(21) Appl. No.: 16/304,502

(22) PCT Filed: May 31, 2017

(86) PCT No.: PCT/US2017/035171
§ 371 (c)(1),
(2) Date: Nov. 26, 2018

(87) PCT Pub. No.: WO2017/213926
PCT Pub. Date: Dec. 14, 2017

(65) Prior Publication Data
US 2019/0217239 A1    Jul. 18, 2019

Related U.S. Application Data

(60) Provisional application No. 62/346,179, filed on Jun. 6, 2016.

(51) Int. Cl.
*B01D 46/52* (2006.01)
*B01D 46/10* (2006.01)
(Continued)

(52) U.S. Cl.
CPC ....... *B01D 46/523* (2013.01); *B01D 39/1607* (2013.01); *B01D 46/0005* (2013.01);
(Continued)

(58) Field of Classification Search
CPC .............. B01D 46/521; B01D 46/523; B01D 46/0005; B01D 46/10; B01D 39/1607;
(Continued)

(56) References Cited

U.S. PATENT DOCUMENTS

RE30,782 E    10/1981 Van Turnhout
4,813,948 A    3/1989 Insley
(Continued)

FOREIGN PATENT DOCUMENTS

| CN | 201454314 | 5/2010 |
|---|---|---|
| WO | WO 2016-032938 | 3/2016 |
| WO | WO 2016-119080 | 8/2016 |

OTHER PUBLICATIONS

International Search Report for PCT International Application No. PCT/US2017/035171, dated Sep. 18, 2017, 6 pages.

*Primary Examiner* — Robert Clemente
(74) *Attorney, Agent, or Firm* — Kenneth B. Wood (57) ABSTRACT

A rigid, channel-framed, non-compressible, non-nestable, pleated air filter, comprising: a tightly-pleated air filter media comprised of a nonwoven fibrous web and with an upstream face and a downstream face, wherein the tightly-pleated air filter media comprises a plurality of upstream (and downstream) pleat tips and upstream (and downstream) pleat valleys, the tightly-pleated air filter media comprising a plurality of upstream (and downstream) linear bridging filaments that are at least substantially parallel to each other and are oriented at least substantially orthogonal to the pleat direction and are extrusion-bonded to at least some of the upstream (and downstream) pleat tips, and, a channel frame comprising four major frame portions, with each major frame portion being mounted on one of the four major edges of the pleated air filter media.

19 Claims, 4 Drawing Sheets

(51) Int. Cl.
  *B01D 39/16* (2006.01)
  *B01D 46/00* (2022.01)
  *D04H 1/56* (2006.01)
  *D04H 3/16* (2006.01)

(52) U.S. Cl.
  CPC ...... *B01D 46/10* (2013.01); *B01D 2239/0435* (2013.01); *B01D 2239/0618* (2013.01); *B01D 2239/0622* (2013.01); *B01D 2239/0627* (2013.01); *B01D 2279/50* (2013.01); *D04H 1/56* (2013.01); *D04H 3/16* (2013.01)

(58) Field of Classification Search
  CPC .... B01D 2239/0435; B01D 2239/0618; B01D 2239/0622; B01D 2239/0627; B01D 2279/50
  See application file for complete search history.

(56) References Cited

U.S. PATENT DOCUMENTS

| | | |
|---|---|---|
| 4,976,677 A | 12/1990 | Siversson |
| 5,230,800 A | 7/1993 | Nelson |
| 5,256,231 A | 10/1993 | Gorman |
| 5,389,175 A | 2/1995 | Wenz |
| 5,620,545 A | 4/1997 | Braun |
| 5,704,953 A * | 1/1998 | Stemmer ............ B01D 46/0023 55/483 |
| 7,052,565 B2 | 5/2006 | Seth |
| 7,235,115 B2 | 6/2007 | Duffy |
| 8,142,538 B2 | 3/2012 | Sundet |
| 8,162,153 B2 | 4/2012 | Fox |
| 8,506,669 B2 | 8/2013 | Fox |
| 8,685,129 B2 | 4/2014 | Lise |
| 9,174,159 B2 | 11/2015 | Sanocki |
| 2004/0011204 A1 | 1/2004 | Both |
| 2005/0150201 A1* | 7/2005 | Choi ................... B01D 39/163 55/499 |
| 2006/0005517 A1* | 1/2006 | Sundet ................. B01D 46/10 55/497 |
| 2008/0026661 A1 | 1/2008 | Fox |
| 2008/0038976 A1 | 2/2008 | Berrigan |
| 2010/0326028 A1 | 12/2010 | Sundet |
| 2011/0084017 A1 | 4/2011 | Pocher |
| 2012/0167535 A1* | 7/2012 | Underwood .......... B31F 1/0025 55/497 |
| 2014/0235419 A1 | 8/2014 | Lise |
| 2015/0047507 A1* | 2/2015 | Fox .................... B01D 46/0032 96/74 |
| 2015/0047508 A1 | 2/2015 | Sanocki |
| 2017/0216756 A1* | 8/2017 | Fox ..................... B01D 46/523 |
| 2020/0129907 A1* | 4/2020 | Fox ........................ B01D 46/10 |

* cited by examiner

CHANNEL-FRAMED, PLEATED AIR FILTER WITH BRIDGING FILAMENTS

BACKGROUND

Pleated filters are commonly used in air filtration applications, e.g. in heating-ventilating-air conditioning (HVAC) systems, room air purifiers, and so on.

SUMMARY

Herein is disclosed a rigid, channel-framed, pleated air filter, comprising a plurality of linear bridging filaments on at least an upstream face of the pleated air filter media of the filter. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Definitions

Although terms such as "top", bottom", "upper", lower", "under", "over", "front", "back", "up" and "down", and "first" and "second" may be used in this disclosure, it should be understood that those terms are used in their relative sense only unless otherwise noted. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match. The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. All references herein to numerical parameters (dimensions, ratios, and so on) are understood to be calculable (unless otherwise noted) by the use of average values derived from a number of measurements of the parameter.

Terms such as "outer", "outward", "outwardmost", "outwardly", and the like, mean in a direction away from the geometric center of a pleated air filter, at least generally along the major plane of the air filter when the filter is in a nominally planar configuration as discussed in detail later herein. Terms such as "inner", "inward", "inwardmost", "inwardly", and the like, mean in a direction generally toward the geometric center of the pleated air filter.

The term "upstream" is used to denote the side of the air filter from which moving air (e.g. in an HVAC system) impinges on the filter media. The term "downstream" is used to denote the side of an air filter through which air exits the filter media. Pleated filters are often marked (or otherwise designated) by the manufacturer to identify upstream and downstream sides in order that the filter be installed in the proper orientation in an HVAC system; thus, the terms upstream and downstream can serve to differentiate the two sides of a pleated filter even if the filter has not yet been positioned in an HVAC system. Various Figures are marked with "u" and "d" arrows to aid in recognition of upstream and downstream sides of the exemplary pleated air filters disclosed herein. (In some embodiments, an air filter as disclosed herein may be interchangeable so that either side can function as the upstream or downstream side.)

The term "rigid" means that a pleated air filter as a whole retains an overall planar shape during ordinary use of the air filter (e.g. in an HVAC system). A rigid air filter by definition excludes an air filter that is capable, in ordinary use, of being conformed e.g. to an arcuate supporting grid or lattice.

The term "channel-framed" denotes a pleated air filter that includes a rigidifying frame that at least substantially ⌣-shaped in cross-section, with upstream and downstream flanges that are at least substantially parallel to each other and at least substantially equidistant along their inward-outward extent.

The term "tightly-pleated" refers to a pleated filter medium that exhibits a pleat frequency of at least about 2 pleats per inch (0.8 pleats per cm), a pleat height of at least about 4 mm, and a pleat tip radius of curvature of less than 2 mm.

The term "non-compressible" refers to framed, pleated filters for which, when moderate force is applied to the filters (e.g. by stacking five of them in a vertical stack with major faces abutting), the pleats of the filter media will not compress to a pleat height that is smaller than the height exhibited when the filters are not stacked atop each other. Rather, in a non-compressible filter the pleated media will be prevented from undergoing any such deformation (whether due to the rigidity of the pleated media itself and/or due to the presence of a channel frame).

By a "bridging filament" is meant a filament that extends between, and is bonded to, at least two pleat tips that are on the same major face of a pleated media.

By a "linear" bridging filament is meant a bridging filament that follows an at least substantially linear path between successive pleat tips that are on the same major face of a pleated media, rather than e.g. following the pleat walls and/or drooping significantly into the pleat valleys.

By "extrusion-bonded" is meant a bridging filament that is bonded to at least some of the fibers of a pleat tip by being extruded as a molten stream of material that is contacted with the pleat tips, cooled, and solidified, in order to bond to the pleat tips. By definition an extrusion-bonded bridging filament is not comprised of a hot melt adhesive composition.

By "compositionally compatible" is meant a bridging filament of thermoplastic organic polymeric material that comprises at least 80% by weight of monomer units of the polymeric material of the filament that are of like chemical composition to that of at least about 80% by weight of the organic polymer material of the fibers of the nonwoven web to which the filament is extrusion-bonded.

DETAILED DESCRIPTION

Figure 1:
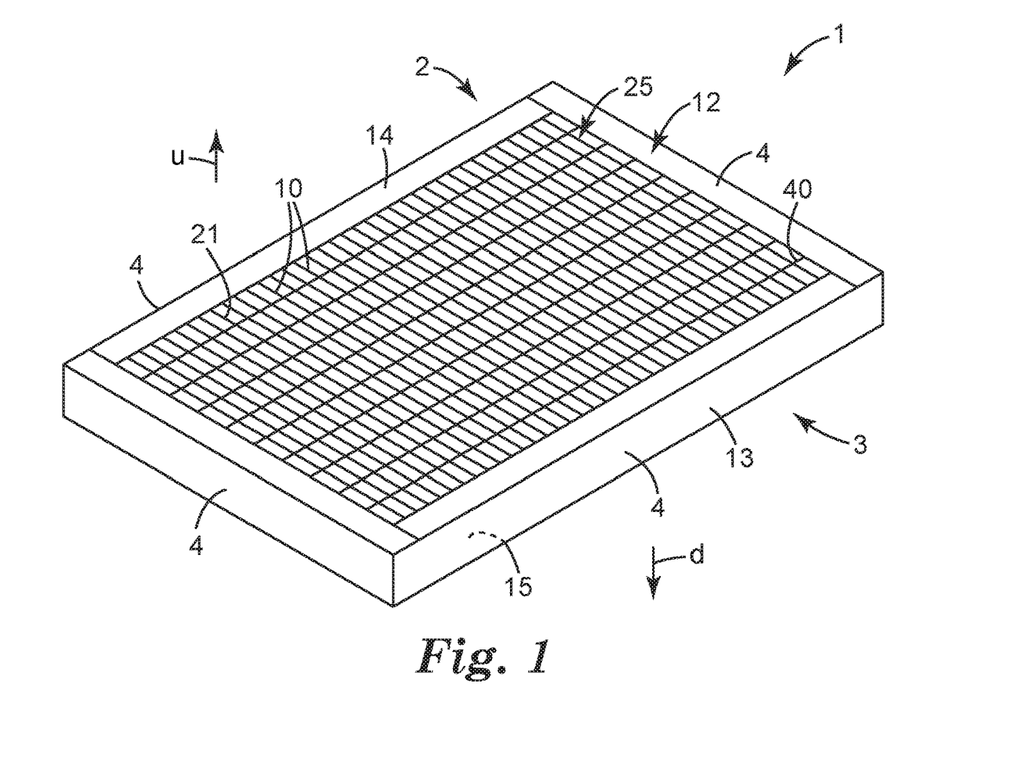
FIG. 1 is a side-upstream perspective view of an exemplary channel-framed, rigid, pleated air filter comprising linear bridging filaments on an upstream face thereof.
Figure 2:
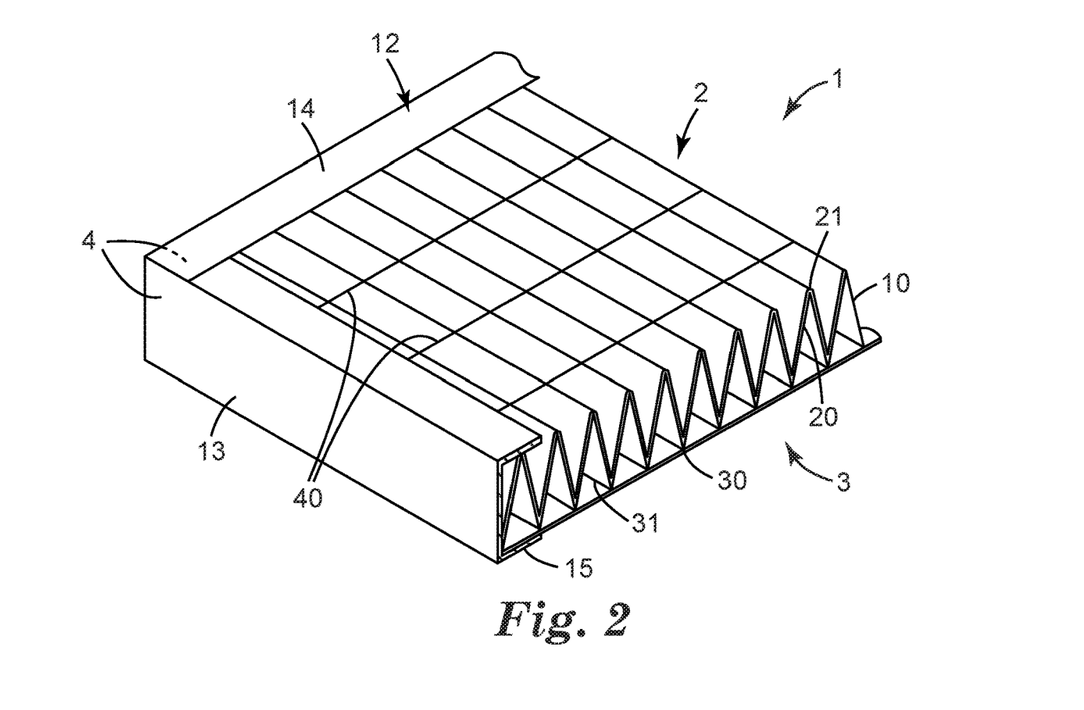
FIG. 2 is a side-upstream partial cutaway perspective view of the exemplary channel-framed, rigid pleated air filter of FIG. 1.

Shown in FIGS. 1 and 2 in perspective view from the upstream side is an exemplary rigid, channel-framed, non-compressible pleated air filter 1, comprising an upstream side 2 and a downstream side 3. Air filter 1 comprises tightly-pleated air filter media 10 with support channel-frame 12 mounted generally on, and surrounding, the perimeter of pleated filter media 10 to form air filter 1. Framed air filter 1 may often be rectangular in shape (which specifically includes square shapes) with pleated filter media 10 thus having a generally rectangular perimeter (which does not preclude irregularities, notches, chamfered or angled corners, or the like, in the perimeter of filter media 10). Framed air filter 1 and filter media 10 thereof, thus often have four major edges 4 as shown in exemplary embodiment in FIG. 1. Tightly-pleated filter media 10 comprises an upstream face 25 and a downstream face 35 as seen most easily in FIG. 3, which depicts a tightly-pleated media 10 with a channel frame omitted. As shown in further detail in FIG. 3, pleated filter media 10 comprises a plurality of upstream pleats 20, oriented in at least generally parallel relation to each other. Each upstream pleat 20 comprises an upstream pleat tip 21 and each adjacent pair of upstream pleats 20 defines an upstream pleat valley 22 therebetween. In use of filter 1, flowing air enters upstream valley 22 and passes into upstream pleat walls 23 so as to penetrate into pleated filter media 10. Pleated filter media 10 further comprises a plurality of downstream pleats 30, in generally parallel relation to each other and in oppositely-facing configuration from upstream pleats 20. Each downstream pleat 30 comprises a downstream pleat tip 31 and each adjacent pair of downstream pleats 30 defines a downstream pleat valley 32 therebetween. Flowing air passes out of downstream pleat walls 33 so as to exit pleated filter media 10. In many embodiments, pleated filter 1 is adapted so that in use of the filter, flowing air will locally approach pleated filter 1, and will locally leave pleated filter 1, along a direction that is at least generally orthogonal to the pleat direction $D_p$. In such embodiments, there may be little or no airflow along the long axis of the valleys of the pleated media in ordinary use of pleated filter 1.

Figure 3:
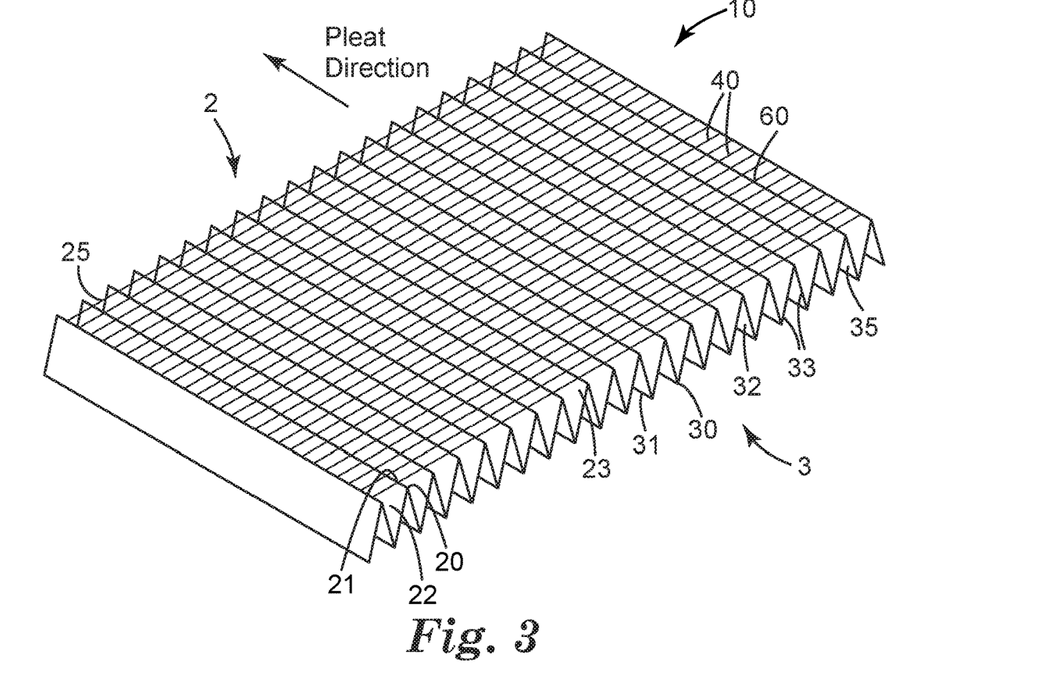
FIG. 3 is a side-upstream perspective view of the pleated air filter media of the air filter of FIG. 1, with the perimeter frame of the filter omitted.

Framed air filter 1 comprises a plurality of linear bridging filaments 40 at least on upstream face 25 of pleated filter media 10, as seen most easily e.g. in FIG. 3. At least portions of at least some of the bridging filaments 40 are bonded to at least portions of at least some of the upstream pleat tips 21 of pleated filter media 10. A bridging filament is one that extends between, and is extrusion-bonded to, at least two same-side (e.g., upstream) pleat tips of pleated filter media 10. By definition, a linear bridging filament is not pleated along with the pleated filter media 10. Furthermore, a linear bridging filament is in discontinuous contact with the pleated material and does not follow the pleated geometry or droop to any significant extent into the pleat valleys.

It will thus be appreciated that (with pleated media 10 in a condition in which it is not subject to any deforming or compressing force) linear bridging filaments 40 will comprise an at least substantially linear appearance when viewed from the side (rather than exhibiting a linear appearance only when viewed directly along the upstream-downstream axis of the filter), as evident in the exemplary embodiments of FIG. 3. Even allowing for occasional slight deviations as may statistically occur in production processes, most portions of most filaments 40 will be spaced away from the majority of the area of the pleat walls; that is, they will be spaced apart from all such pleat wall areas except those at, or very close to, the pleat tips 21. Upstream bridging filaments 40 are thus by definition in discontinuous contact with the upstream face 25 of pleated filter media 10. A bridging filament is thus distinguished from a strand that is formed e.g. by drizzling a bead of hardenable liquid adhesive onto a pleated medium so that it at least generally follows the pleated structure (at least generally penetrates or droops into the pleat valleys) and is then hardened in that configuration. A linear bridging filament as disclosed herein thus by definition excludes e.g. the adhesive strands disclosed in U.S. Pat. No. 7,235,115.

In embodiments of the general type shown in FIG. 3, bridging filaments 40 may be oriented at least substantially orthogonal to (e.g., within +/−about 5 degrees of 90 degrees to) the pleat direction of pleated filter media 10 (with pleat direction meaning a direction parallel to pleat tips 21 and 31, as signified by the arrow in FIG. 3). In some embodiments, bridging filaments 40 may be oriented at least essentially orthogonal to the pleat direction. In various embodiments, bridging filaments 40 may be at least generally, substantially, or essentially parallel to each other.

In some embodiments, bridging filaments 40 may extend between, and be bonded to, e.g. three, four, eight, sixteen, thirty-two, or more upstream pleat tips 21. In some embodiments, at least some bridging filaments may be continuous, meaning that they extend along the entire length of pleated filter media 10 (as in the exemplary design of FIG. 3). Such continuous bridging filaments thus will not be severed or otherwise made discontinuous anywhere along the entire length of pleated filter media 10. In any case, a bridging filament 40 (continuous or not) will be distinguished from filaments that are cut or otherwise deliberately made so short that they do not extend between at least two upstream pleat tips.

It has been found that even with relatively stiff filter media, bridging filaments that are present at least on the upstream face of the pleated filter media can enhance the overall rigidity of the entire air filter 1 (e.g. in cooperation with the channel frame). The effects of the bridging filaments may be particularly helpful when used with tightly-pleated media, due to the large number of filament-pleat tip bonds that are present per unit length of pleated media.

Figure 4:
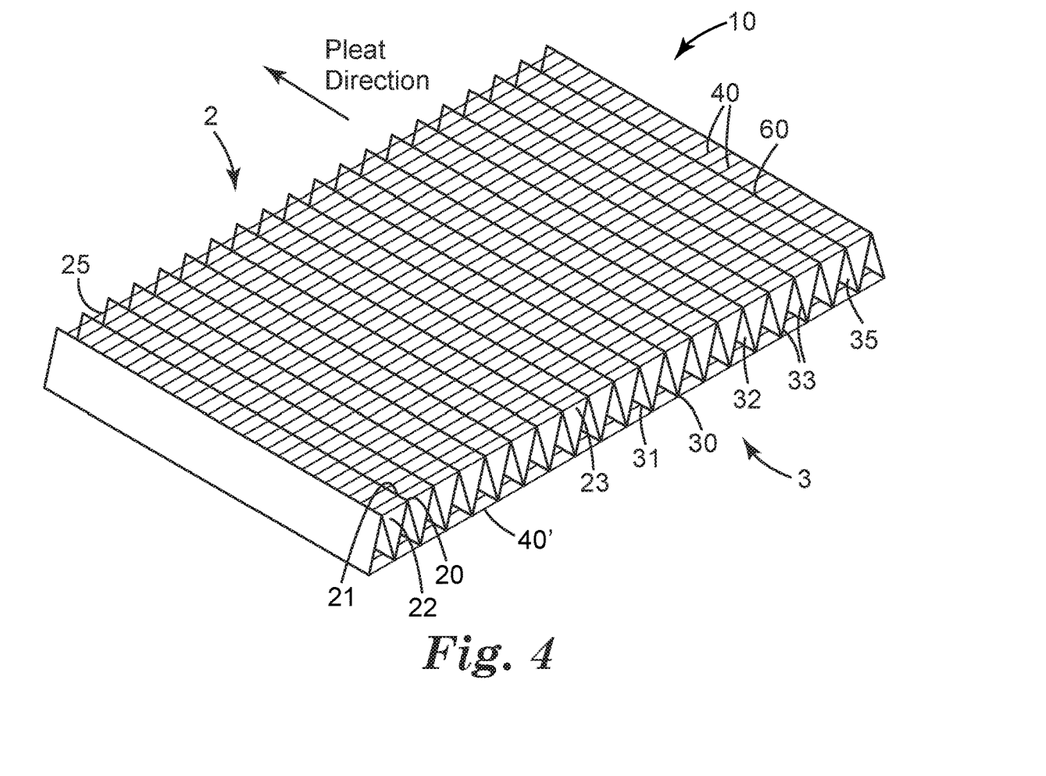
FIG. 4 is a side-upstream perspective view of another pleated air filter media, comprising linear bridging filaments on an upstream face thereof and on a downstream face thereof.

In embodiments of the general type shown in FIG. 4, a first set of bridging filaments 40 may be provided on the upstream face 25 of pleated filter media 10, and a second set of bridging filaments 40' may be provided on the downstream face 35 of pleated filter media 10. The first and second sets of bridging filaments may be similar or the same in composition (and/or in geometric parameters such as e.g. spacing, diameter, and so on); or they may differ in any or all such composition and/or parameters.

Linear bridging filaments 40 (and 40' if present) may be made of any material that can be extruded as filaments and extrusion-bonded to the pleat tips and, when so bonded, can provide the desired physical properties (e.g., flexibility, inextensibility, etc.). Such materials may include any suitable extrudable thermoplastic or thermoset organic polymeric materials (whether naturally occurring or synthetic). Thus, common extrudable polymeric materials (including but not limited to polyolefins such as e.g. polypropylene, polyethylene, and copolymers thereof; poly(lactic acid); polyamides; polyethylene terephthalates; and so on), may be used to form the bridging filaments. Such extrudable organic polymeric materials are often comprised of relatively high molecular weight polymers, copolymers or blends. Other, minor constituents may be present, e.g. antioxidants, colorants, pigments, dyes, processing aids, and so on.

By definition, extrusion-bonded linear bridging filaments are not comprised of any kind of (hardened) glue or adhesive, e.g. drizzle glue or photocured adhesive. In particular, an extrusion-bonded linear bridging filament is not comprised of a hot melt adhesive composition. Hot melt adhesives as commonly used are well known as comprising a base material (e.g. a polymeric material) blended with significant amounts of other components (such as e.g. organic waxes) to reduce the melting point and/or the melt viscosity of the mixture so that it can be processed with hot-melt adhesive equipment (e.g. grid-melters and metering pumps) rather than necessitating the use of an extruder. (Hot melt adhesives may also often comprise components such as tackifiers to increase the tackiness of the mixture.) As such, hot melt adhesives (even after being cooled and hardened) are readily distinguished from extrusion-bonded materials as disclosed herein, as will be appreciated by ordinary artisans. For example, hot melt adhesives disclosed in U.S. Pat. No. 7,235,115 are distinguished from extrusion-bonded linear bridging filaments as disclosed herein. In some specific embodiments, an extrusion-bonded linear bridging filament may comprise less than about 10, 5.0, or 2.0 wt. % of organic wax. In some specific embodiments, an extrusion-bonded linear bridging filament may comprise less than about 10, 5.0, or 2.0 wt. % of amorphous polyolefin homopolymers such as e.g. atactic polypropylene; and/or less than about 10, 5.0, or 2.0 wt. % of ethylene-vinyl acetate (EVA) copolymers.

In some embodiments a bridging filament may be compositionally compatible with the organic polymeric material of the fibers of the nonwoven web to which the filament is extrusion-bonded. By "compositionally compatible" is meant that the filaments of thermoplastic organic polymeric material include at least 80% by weight of monomer units of the polymeric material of the filaments that are of like chemical composition to that of by at least about 80% by weight of the organic polymer material of the fibers of the nonwoven web to which the filaments are extrusion-bonded. In other words, the filaments can have a sufficient number of monomer units that are of like composition to monomer units of the fibers of the nonwoven web, that molecular intermingling may take place so that thermal bonding of filaments to fibers can occur. By way of a specific example, bridging filaments might comprise 80% or more by weight of polypropylene monomer units, with the pleated media (nonwoven web) to which they are bonded also comprising 80% or more by weight of polypropylene monomer units. This latter condition may be provided either within individual fibers, by a mixture of fibers, or by a combination of both. For example, a nonwoven web could be comprised of e.g. 80% by weight polypropylene (PP) homopolymer fibers and 20% by weight polyethylene (PE) fibers; or it could consist of fibers that are 80/20 PP/PE copolymers. Either would meet the criteria of being compositionally compatible with filaments that include at least 80% polypropylene monomer units In further embodiments, filaments may be "compositionally similar" to the organic polymeric material of the fibers of the nonwoven web to which the filament is extrusion-bonded, meaning that at least 90% by weight of monomer units of the polymeric material of the filaments are of like chemical composition to that of by at least about 90% by weight of the organic polymer material of the fibers of the nonwoven web. In further embodiments, filaments may be substantially compositionally similar to the organic polymeric material of the fibers of the nonwoven web to which the filament is extrusion-bonded, meaning that at least 95% by weight of monomer units of the polymeric material of the filaments are of like chemical composition to that of by at least about 95% by weight of the organic polymer material of the fibers of the nonwoven web. In still further embodiments, filaments may be essentially compositionally identical to the organic polymeric material of the fibers of the nonwoven web to which the filaments are extrusion-bonded, meaning that at least 98% by weight of monomer units of the polymeric material of the filaments are of like chemical composition to that of by at least about 98% by weight of the organic polymer material of the fibers of the nonwoven web.

In all such evaluations, by "like" chemical composition of monomer units is meant that the monomer units, individually or collectively, are the same. For example, polypropylene units are of like composition to polypropylene units; polypropylene units are not of like composition to polyethylene units. (However, again by way of specific example, a filament that is a random copolymer of 80/20 PP/PE monomer units is of like composition to a fibrous web whose fibers are a random copolymer of 80/20 PP/PE monomer units). Also, in such evaluations the presence of all non-organic-polymeric material (e.g. mineral fillers, antioxidants, colorants, pigments, and so no) is disregarded.

It is noted that even in the absence of the filaments being e.g. at least compositionally similar to the organic polymeric material of the fibers of the nonwoven web (and in the absence of the material of the filaments exhibiting any pressure-sensitive adhesive properties), adequate bonding of filaments to the pleat tips of the fibrous web may occur. Such bonding may be achieved e.g. by way of the molten material of the incipient filament penetrating into interstitial spaces between the fibers of the nonwoven web.

In specific embodiments, bridging filaments may be comprised of an organic polymeric material that is an electret-comprising composition, as discussed later herein. In some embodiments, bridging filaments may be non-elastic. Non-elastic as defined herein encompasses any material that does not have the relatively high reversible extensibility (exemplified e.g. by the ability to be reversibly elongated to e.g. 100% or more without undergoing plastic deformation) characteristic of elastic materials such as natural rubber, SBR rubber, lycra, etc. In other embodiments, the filaments may be made of an elastic material (chosen from e.g. the above-listed elastic materials).

In some embodiments, bridging filaments may exhibit a melting point (measured by differential scanning calorimetry at a rate of 10 degrees K per minute) that is within about 30, 20, 10 or 5 degrees K of the melting point (measured in the same manner) of the fibers of the nonwoven web to which the filaments are extrusion-bonded.

In various embodiments, bridging filaments may comprise an average diameter (or equivalent diameter in the case of filaments with a non-circular or irregular cross-section) of at most about 2, 1, 0.5, 0.2, or 0.1 mm. In further embodiments, the filaments may comprise an average diameter or equivalent diameter of at least about 0.05, 0.10, or 0.20 mm. Bridging filaments may comprise any suitable shape when viewed in cross section, (e.g., generally round, square, oblong, etc.). All such dimensions and shapes should be evaluated at locations between the pleat tips rather than at the bond to the pleat tips, since considerable deformation of the filament shape may occur at the bond locations, as discussed below. Filaments can comprise suitable spacings between individual filaments as desired (e.g., when filaments 40 are arranged e.g. in parallel to each other so that such an average spacing can be measured). In various embodiments, the filament spacing can be at least about 2, 4, 6, 8, 16 or 24 mm. In additional embodiments, the filament spacing can be at most about 50, 40, 30, 20, 15, 12, 10, or 8 mm. The filament spacings can be relatively constant or can be varied. Some inherent variation in filament spacing may occur in production and handling of filaments, of course. Regardless of the specific arrangements, a suitable set of filaments will collectively comprise a highly open structure (in various embodiments, comprising greater than at least 80, 90, or 95% open area) so as to allow sufficient airflow through pleated filter media 10.

Bridging filaments thus take the form of individual filaments that are individually provided (e.g., extruded onto pleat tips of pleated filter media 10). In at least some embodiments, bridging filaments are oriented at least substantially parallel to each other (and are all at least substantially orthogonal to the pleat direction $D_p$ of the pleated media) and are not connected with each either directly, or indirectly by way of any other entity (except for the pleated filter medium). Such embodiments preclude the use of filaments that are e.g. part of a pre-existing scrim that includes filaments oriented in a wide variety of directions; e.g. scrims with multi-directional or randomly oriented fibers. Moreover, any such set of bridging filaments as disclosed herein will be distinguished from a non-filamentary support structure or structures that are provided on the downstream side of a pleated filter (and that are often bonded to a perimeter frame thereof and/or are bonded to the pleated filter media itself) to rigidify the pleated filter media. In other words, a set of bridging filaments as disclosed herein does not encompass e.g. perforated sheets of cardboard or metal, or strips of cardboard or metal, as are often provided on the downstream side of a pleated filter to enable the pleated filter to withstand the forces encountered in a high-pressure HVAC airflow condition in the absence of a filter-support layer. In some embodiments, no such ancillary components (e.g. perforated sheets, straps, and so on) are present. In other embodiments, any such ancillary components may be present in addition to the bridging filaments. In some particular embodiments the pleated air filter does not include any kind of reinforcing layer (e.g. a wire mesh) that is bonded (e.g. adhesively bonded) to a major surface of the media and is pleated along with the media.

Pleated filter media 10 may be any suitable media that is capable of being tightly pleated as described herein and that includes at least some fibers that are capable of having filaments extrusion-bonded thereto. Potentially suitable materials may take any form including e.g. nonwovens, such as melt blown or spunbond webs of synthetic or natural fibers; scrims; woven or knitted materials and so on. Any suitable method of making a nonwoven web (e.g., melt-blowing, melt-spinning, air-laying, carding, and so on) may be used. Filter media 10 may also include sorbents, catalysts, and/or activated carbon (whether in the form of e.g. granules, fibers, fabric, and molded shapes).

Multilayer media, e.g. laminated media, can also be used as filter media 10. Such media may consist of laminated layers of the media discussed above or of other substrates laminated to one or more layers of filter media, for example. In some embodiments, a prefilter layer may be used on the upstream side of filter media 10. Such a prefilter layer may comprise e.g. polypropylene, polyethylene, polyethylene terephthalate, poly(lactic acid), or blends of these materials. In other words, in some embodiments pleated filter media 10 may comprise a base (e.g., filtration) layer, along with any other layer or layers as desired for any purpose, as long as it allows pleated media 10 to remain non-self-supporting as defined and described herein. For example, a highly open plastic netting or mesh might be laminated to the pleated media, in order to e g enhance the abrasion resistance of the media. Any such layer may be bonded to e.g. a base (e.g. filtration) layer by any suitable method, e.g. by melt-bonding, by way of an adhesive (hot melt adhesive, pressure-sensitive adhesive, and so on), calendering, ultrasonic bonding, etc.

Regardless of the physical form of the filter media (e.g. whether a woven or knitted material, a nonwoven material, etc.) the media will include sufficient components (e.g. fibers) that are made of an organic polymeric material to which bridging filaments can be extrusion-bonded. In some embodiments, the filter media includes polyolefinic fibers (e.g. polyethylene, polypropylene and copolymers thereof). In some specific embodiments, a filter media comprises, or consists essentially of polypropylene fibers (noting that this latter conditions does not preclude the presence of e.g. electret moities, and/or processing additives, UV stabilizers and so on, as are customarily used with polypropylene). Regardless of the specific composition, the filtration media may be chosen so that bridging filaments may be selected that are compositionally compatible therewith. In various embodiments, a nonwoven web (e.g. a spunbond or melt-blown web) comprised of, or consisting essentially of, polypropylene homopolymer fibers may be used in combination with bridging filaments that are likewise comprised of, or consist essentially of, polypropylene homopolymers.

In specific embodiments, pleated filter media 10 may be an electret material, comprised of e.g. any charged material, e.g. split fibrillated charged fibers as described in U.S. Pat. RE 30782. Such charged fibers can be formed into a nonwoven web by conventional means and optionally joined to a scrim such as disclosed in U.S. Pat. No. 5,230,800 forming an outer support layer. In other specific embodiments, filter media 10 can be a melt blown microfiber nonwoven web, e.g. such as disclosed in U.S. Pat. No. 4,813,948, which can optionally be joined to a secondary layer during web formation as disclosed in that patent, or subsequently joined to a secondary web in any conventional manner. Filtration media that may be particularly suitable for certain applications might include e.g. media of the general type described in U.S. Pat. No. 8,162,153 to Fox; media of the general type described in U.S. Patent Application Publication 20080038976 to Berrigan; and, media of the general type described in U.S. Patent Application Publication 20040011204 to Both, and media generally known as tribocharged media. Any such media can be charged to form an electret, if desired.

In order to be able to be tightly pleated and to maintain the tightly-pleated configuration (e.g. as opposed to relaxing so that the radius of curvature of the pleat tips increases significantly over time) pleated filter media 10 may advantageously comprise a relatively high stiffness. In some embodiments, the stiffness of the media may be characterized by a Gurley Stiffness (measured as described in U.S. Pat. No. 8,506,669, which is incorporated by reference herein for this purpose). In various embodiments, pleated filter media 10 may be comprised of a material that exhibits a Gurley Stiffness (measured in an unpleated configuration) of greater than 100, 150, 175, 200, 225, 250, or 300 mg. The Gurley stiffness is measured with the filter media in an unpleated condition, and is measured along the long axis (machine direction) of the media (this because filter media is typically pleated with the pleat direction Pa oriented transversely along the web width, so that the stiffness in the machine direction is of primary importance with regard to characterizing the ability of the pleated material to resist pleat deformation or collapse).

In particular embodiments, the filtration media may be a spunbond nonwoven web of the general type disclosed in U.S. Pat. No. 8,506,669 to Fox. Such a spunbond media may advantageously exhibit a relatively high stiffness and may be particularly amenable to being tightly pleated and maintaining the tightly-pleated configuration. In other particular embodiments, the filtration media may be a meltblown (BMF) nonwoven web of the general type disclosed in U.S. Pat. No. 8,142,538 to Sundet. Such a meltblown media may similarly exhibit a relatively high stiffness and may be particularly amenable to being tightly pleated and maintaining the tightly-pleated configuration.

Figure 5:
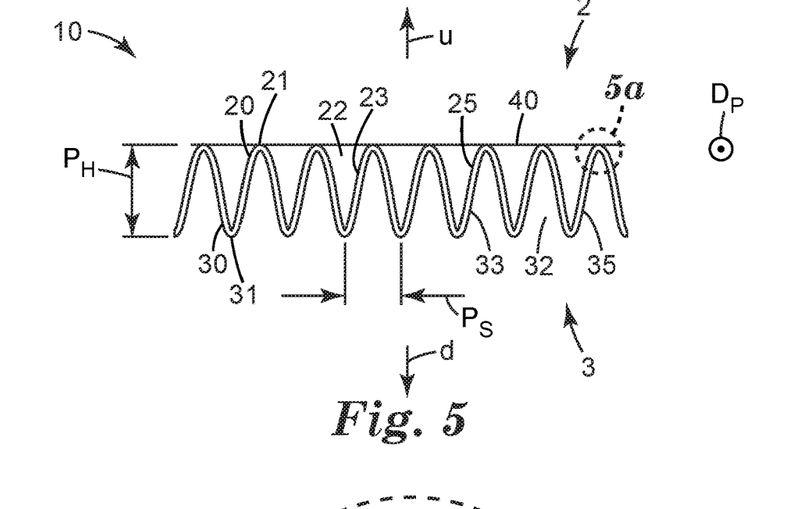
FIGS. 5 and 5a are side schematic cross sectional views of a portion of an exemplary pleated air filter media.

Details of pleat geometry are discussed with reference to the side view of FIG. 5 (in which the pleated air filter media is viewed along the pleat direction $D_p$). Pleat height, pleat spacing and frequency, and pleat-tip radius of curvature are evaluated (as is the previously-described planarity of filaments 40) with the pleated air filter media 10 in a planar configuration e.g. as assembled with a channel frame to provide a framed filter 1. In such a configuration, the pleat height (pleat amplitude) is the distance ($P_h$ in FIG. 5) from upstream tip to downstream tip, along a direction that is orthogonal to the overall major plane of filter 1/filter media 10. By definition, the pleat height of a tightly-pleated air filter media will be at least about 4 mm. In various embodiments, the pleat height of media 10 can be at least about 6, 8, 10, 12, 14, 16, 18, 20, 30, or 40 mm. In further embodiments, the pleat height may be at most about 42, 32, 22, 20, 15, 12, 10, or 8 mm.

The pleat spacing ($P_s$ in FIG. 5) is the distance between nearest-neighbor same-side pleat tips, along a direction that is in the major plane of the filter media. In various embodiments the pleat spacing may be at most about 12, 10, 8, 6 or 4 mm. In further embodiments the pleat spacing may be at least about 3, 5, 7, 9 or 11 mm. The pleat frequency means the number of times that a reference point, e.g. an upstream pleat tip, repeats per cm of distance. (Although not shown in FIG. 5, the pleat frequency is straightforwardly related to the pleat spacing.) By definition, the pleat frequency of a tightly-pleated air filter media will be at least about 0.8 pleats per cm (2 pleats per inch). In various embodiments the pleat frequency may be least about 1.0, 1.2, 1.4, 1.8, 2.2, 2.6, or 3.0 pleats per cm; in further embodiments the pleat frequency may be at most about 3.2, 2.8, 2.4, 2.0, 1.6, or 1.2, pleats per cm.

Figure 5A:
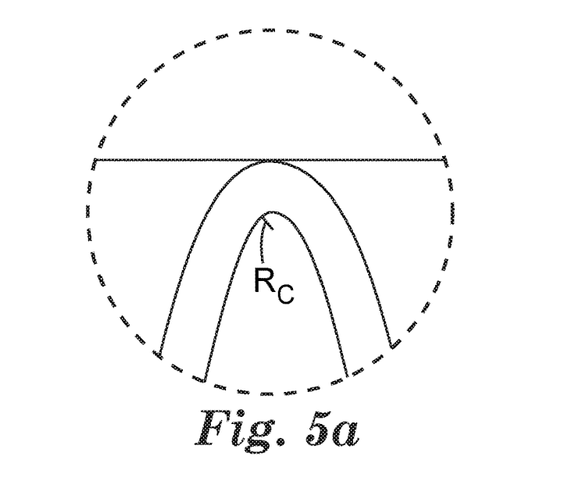

The radius of curvature ($R_c$) of pleat tips can be evaluated as shown in the magnified view of FIG. 5a. The radius of curvature of pleat tips should be measured at locations along the pleats that are in between the bond points with the filaments, since some slight deformation of the pleat tips may occur at such bonding locations. By definition, the radius of curvature of the pleat tips of a tightly-pleated air filter media will be at most about 2 mm. In further embodiments, the radius of curvature of the pleat tips may be at most about 1.8, 1.6, 1.4, 1.2, 1.0, 0.8, or 0.6 mm. In further embodiments the radius of curvature of the pleat tips may be at least about 0.5, 0.7, 0.9, 1.1, 1.3, 1.5, or 1.7 mm.

It will be appreciated that tightly-pleated pleats with such a small radius of curvature may often be relatively sharp-tipped, "zig-zag" style pleats that are distinguished from e.g. sinusoidal pleats that exhibit pleat "tips" with a large radius of curvature. Such zig-zag style pleats may also often exhibit very flat pleat walls (that meet at pleat tips with an extremely small radius of curvature), again in contrast to sinusoidal pleats. Such pleats may be advantageously used in e.g. relatively stiff filter media and may be obtained e.g. by scoring the filter media to provide a score line, along which the media is then folded to form a very sharp pleat. In particular, a pleat height that is relatively high in comparison to the average radius of curvature of the pleated media may be advantageous. Thus in various embodiments, the ratio of the pleat height to the average radius of curvature may be greater than 3, 6, 10, 20, 40, 60, 80, or 100. In further embodiments, the ratio of the pleat height to the average radius of curvature may be at most about 400, 200, 400, 100, 80, 40, or 20.

By definition, a pleated air filter as disclosed herein includes a rigidifying perimeter frame 12 that is a channel frame. A channel frame is one in which each major portion of the frame (e.g. of the four portions that are each mounted on a major edge of the pleated air filter media) is at least substantially ⌴-shaped in cross-section. Each major frame portion comprises a sidewall 13 with a major plane that is oriented at least generally parallel to the upstream-downstream axis of the pleated air filter. Each major frame portion further has upstream flanges 14 and downstream flanges 15 (as depicted e.g. in FIGS. 1 and 2) that are at least substantially parallel to each other and are at least substantially equidistant along their inward-outward extent. Such channel frames are well known in the art (being described e.g. in U.S. Pat. No. 8,685,129) and are distinguished from pinch frames (e.g. of the general type disclosed in U.S. Pat. No. 9,174,159). A channel-framed air filter is thus by definition distinguished from a pinch-framed air filter Channel frame 12 can be made of any suitable material, e.g. molded plastic, chipboard, and so on. A channel frame may take the form of a single piece of material (e.g. a "box" frame) that provides all four frame portions; or it may be formed by attaching two, three, or four frame pieces (e.g., two L-shaped pieces) to each other to form the finished frame. In particular embodiments, a channel frame (e.g. a box frame) may comprise one or more downstream support members (that may collectively form a downstream support grill e.g. of the general type disclosed in U.S. Pat. No. 8,685,129) that provide downstream support. In particular embodiments, such a frame may be used with pleated filter media that comprises bridging filaments only on the upstream face thereof and not on the downstream face.

Pleated air filter media 10 may be advantageously stiff as discussed later herein; moreover, a rigidifying perimeter support frame 12, specifically a channel frame as discussed above, is present. Thus, air filter 1 is rigid, meaning that it retains an overall planar shape during ordinary use of the air filter (including when it is installed in an HVAC system and subjected to air flow). A rigid air filter by definition excludes an air filter that is capable, in ordinary use, of being conformed e.g. to an arcuate supporting grid or lattice (e.g. a mesh support of the type often found in so-called mini-split heating and air-conditioning units).

Pleated air filter 1 is non-compressible by definition. By this is meant that when moderate force is applied to a set of air filters 1 (e.g. by stacking five of them in a vertical stack with major faces abutting each other), the pleats of the filter media will not compress to a pleat height that is smaller than the height exhibited when the filters are not stacked atop each other. Rather, in non-compressible filters the pleated media will be prevented from undergoing any such deformation. Such properties may be due to the presence of a channel frame as disclosed above, and may be enhanced by the stiffness of the pleated media itself. Also by definition, pleated air filters 1 as disclosed herein are not nestable with each other. That is, they cannot be stacked together in such manner that the total dimension of the stack (along the upstream-downstream axis of the filters) is less than the dimension of an individual filter multiplied by the number of filters in the stack. Such filters are distinguished from nestable filters as disclosed e.g. in U.S. Pat. No. 9,174,159.

In some embodiments, pleated filter media 10, with linear bridging filaments on at least the upstream face of the pleated media, is self-supporting. By this is meant that the pleated air filter media, including bridging filaments but in the absence of a frame, when placed in a conventional perimeter-holding fixture of a forced-air HVAC system is able to withstand the forces developed when air impinges on the upstream face of the pleated air filter media to develop a pressure drop of at least 0.2 inch of water when tested in the manner described in the Examples section of U.S. Pat. No. 9,174,159. By able to withstand such forces means that the pleated air filter media does not collapse, deform, becomes dislodged, rupture, or the like, so as to render the performance of the air filter media unsatisfactory.

Tightly-pleated filter media 10 can be pleated by any suitable method that does not include "corrugating" processes in which the filter media is processed through a set of corrugating gears e.g. as disclosed in U.S. Pat. No. 5,256,231. The term pleated filter media as used herein thus does not encompass corrugated media (which by definition will lack score lines) and also does not encompass filter media that is formed into a folded or puckered shape by way of the shrinking of a shape-memory polymer that is attached to portions thereof. Useful pleating methods may include any in which a web of filter media is fed to a pleating device, which device folds the filter media at desired intervals, with the thus-formed pleats being gathered in a relatively tight pack. The pleated filter media web may then be processed through a pleat spacing device that adjusts and sets the pleats at a desired pleat spacing. One exemplary type of pleat spacing device is described in U.S. Pat. No. 4,976,677 and includes a helical screw conveyor in which the flight or pitch of the screw conveyor windings establishes the desired pleat spacing. Another general type of pleat spacing device is described in U.S. Pat. No. 5,389,175 and includes a conveyor having a plurality of spaced-apart flites or cleats. Individual flites or cleats carry or hold consecutive pleats during movement of the conveyor, such that the resultant pleat spacing is dictated by the spacing between adjacent flights or cleats.

It will be apparent that the above pleating methods typically produce fixed pleat spacings that are predetermined e.g. by a screw conveyor winding spacing or by the spacing between flites or cleats. In other embodiments, a filter media may be pleated by an apparatus and method of the general type described in U. S. Patent Application Publication No. 20140235419, which allows user-selected adjustment of the pleat spacings. In systems of this general type, upper and lower conveyors are operated at selected rates with at least one of the conveyor rates being alterable by a user to establish a desired pleat spacing.

In any of the above methods (whether involving fixed pleat spacings or selectable pleat spacings), the pleating process may be assisted if desired by scoring the filter media to provide score lines along which the filter media is folded to form pleat tips. It will be appreciated that such score lines, e.g. in combination with a relatively stiff filter media, can advantageously allow the production of tightly-pleated media that has relatively sharp pleat tips (i.e. with a small radii of curvature) and that may also have relatively straight (rather than arcuate) pleat walls. It will further be appreciated that such score lines will be readily visible (whether on the "top" side or the "under" side of a pleat tip) and identifiable in the pleated media. Such scoring may be performed using any desired apparatus and method, e.g. by the use of a rotary-score pleating apparatus. In any of the above methods, pleats may be heat-set e.g. with one or more infrared heaters. (Various aspects of pleating, including scoring and heat-setting, are disclosed in detail in U.S. Pat. No. 7,235,115.)

Bridging filaments may be generated by any desired extrusion apparatus and method that will provide streams of molten extrudate in such form that they can be extrusion-bonded to pleat tips of pleated filter media. By definition, extrusion-bonding as disclosed herein, and extrusion-bonds formed thereby, are distinguished from methods and resulting bonds such as achieved by e.g. ultrasonic bonding, solvent-bonding, bonding by way of pressure-sensitive adhesives or photocurable adhesives, and so on. In other words, an ordinary artisan will be able to distinguish between such bonds. Such an extrusion apparatus may be any kind of extruder (e.g. a single-screw extruder, twin-screw extruder, and so on) that comprises a die with orifices for extruding an organic thermoplastic or thermoset material as molten streams in an at least generally parallel, spaced-apart relationship. Each bridging filament may be formed by extruding a volumetric flowstream of molten material from an orifice of the die. The dimensions of the filaments may be varied e.g. by changing the extruder screw speed and/or by changing the speed at which the pleated media is moved is moved relative to the extruded streams of molten material. In most embodiments, the molten streams will be extruded in a direction this is at least generally aligned with the machine direction (i.e. the longitudinal direction) of the pleated media and that is at least generally orthogonal to the pleat direction of the pleated media.

In many embodiments, the molten streams are brought into contact with the pleat tips after the pleat spacing has been established and the pleat spacing is not changed after the molten streams are contacted with the pleat tips. This can provide that, as noted previously, the thus-produced filaments have an at least substantially linear appearance when viewed from the side and do not follow or contact the pleat walls down into the pleat valleys to any significant extent.

Thus, such filaments would not necessarily be expected to lend rigidity to individual pleats in the manner described for the non-linear adhesive strands of U.S. Pat. No. 7,235,115. Such filaments nevertheless have been found to advantageously enhance the overall rigidity of a tightly-pleated, framed air filter as discussed earlier herein.

In some embodiments an extrusion apparatus may be set up in-line with a pleating apparatus so that the bridging filaments are bonded to the pleated filter media immediately after the pleats are formed. For example, at least a first extruder that provides upstream bridging filaments may be used in concert with the user-selectable pleating apparatus disclosed in U.S. Patent Application Publication No. 20140235419. (A second extruder, configured to extrude molten streams onto the downstream face of the pleated media, may also be used if the pleated air filter is to comprise downstream bridging filaments as well.) In other embodiments a pleated filter media may be retained and stored as a pleat pack (in which the pleats may be compressed together (accordionized) for easier storage of the pleat pack). The pleat pack may then be brought to the desired pleat spacing (e.g. it may be expanded from a compressed storage configuration) and the bridging filaments extruded onto, and bonded to pleat tips of, at least an upstream face of the pleated media.

In some embodiments, the conditions under which the streams of molten thermoplastic organic material are brought to the pleated media may be advantageously controlled. In particular embodiments, the streams of molten extrudate may be cooled, e.g. by being passed through moving cooled gas (e.g. air), by being passed through moving ambient air, or even by being passed through quiescent ambient air. Such measures can provide that the streams achieve a desirably high viscosity and/or a degree of partial solidification that allows them to be deposited onto pleat tips and bonded thereto while spanning the pleat valleys rather than e.g. drooping thereinto.

In some embodiments the streams of molten extrudate may be extruded onto a support surface (e.g. a roll with a suitably controlled surface temperature) that presents the streams to the pleated media for bonding thereto. The support surface may also (e.g. by way of cooling the molten streams) facilitate at least an increase in viscosity, or even partial solidification, of the streams into filaments in similar manner to that noted above. The support surface bearing e.g. semi-solidified filaments thereon can be brought into close proximity with the pleat tips of the pleated media so that the pleat tips contact the incipient filaments. The paths of the support surface and the pleat tips can then diverge so that the filaments separate from the support surface. (The support surface may be treated, or may comprise an outwardmost layer, of any composition that can enhance the ability to separate the filaments from the support surface.)

Figure 6:
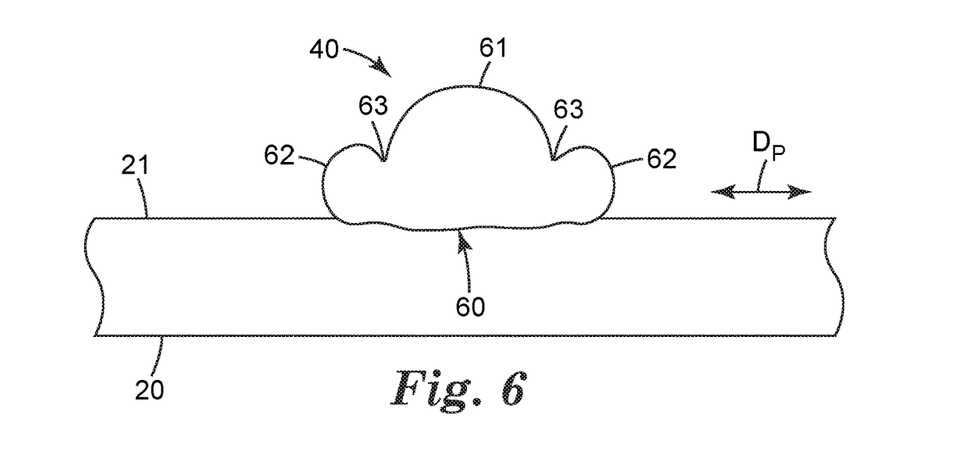
FIG. 6 is an idealized cross-sectional view of an exemplary bond between a linear bridging filament and a pleat tip.
Figure 7:
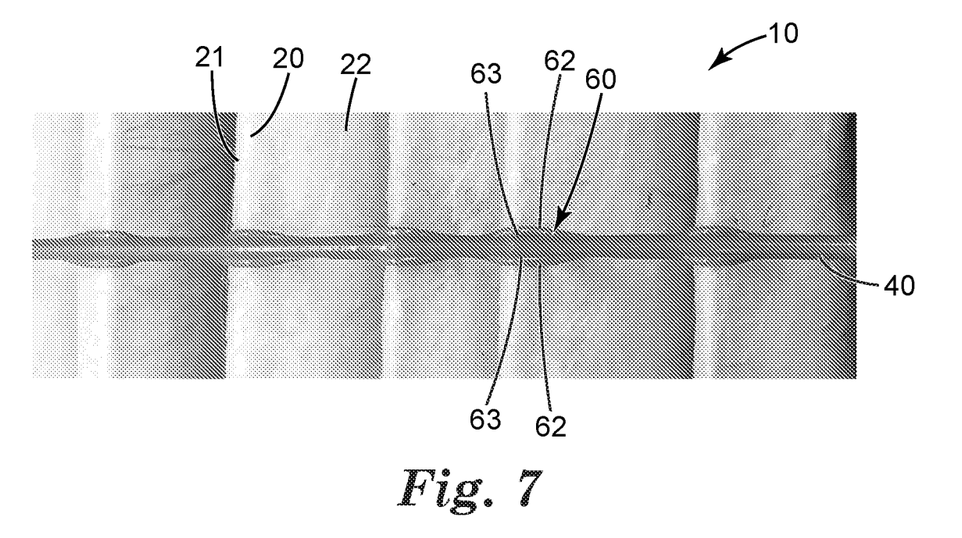
FIG. 7 is an optical micrograph in top perspective view, of an exemplary Working Example sample comprising a linear bridging filament bonded to pleat tips of a pleated air filter media.

In some embodiments a molten stream (and the resulting incipient filament) may be preferentially cooled on the side of the stream that is in contact with the support surface. This can provide that the opposite side of the filament (i.e., the side that is to contact the pleat tips) may still be relatively molten and thus of lower viscosity in comparison to the side of the filament that has been in contact with the support surface. This opposite side of the filament may thus still be relatively molten when contacted with the pleat tips and consequently may be displaced sideways and rearward relative to the main body of the filament. As shown in generic representation in FIG. 6 and as is readily observable in the optical photograph of FIG. 7, this can provide filament-pleat tip bonds 60 with a characteristic structure in which secondary strands 62 are visible that laterally flank the main (central) strand 61 with recessed seams 63 being visible between the secondary strands 62 and main central strand 61. Such bonds 60 can thus having a striking visual appearance and will be termed fleur-de-lis bonds (owing to their characteristic appearance when viewed in cross-section) for convenience of description. Such bonds can be readily distinguished from bonds in which e.g. a pleat-tip contacting portion of a molten strand may spread sideways as a whole to form a somewhat flattened structure without readily identifiable recessed seams 63 between secondary strands 62 and a central strand 61.

In some embodiments, pleated air filter media 10 may be a nonwoven web (e.g. a spunbond nonwoven web) comprising organic polymeric fibers at least some of which comprise electrets. In particular embodiments, bridging filaments 40 may be made of an organic polymeric material of the same electret-comprising composition as the organic polymeric fibers of the nonwoven web of the pleated air filter media. For example, the spunbond web may be made of polypropylene fibers that comprise electrets, and the bridging filaments may likewise be made of polypropylene that comprises electrets. It will be appreciated that in some embodiments waste material from production of the nonwoven web or from production of pleated filters therefrom (e.g., material that is trimmed away from the web); or, waste fibers resulting from the meltspinning process, can be advantageously used as raw material for extrusion of the bridging filaments. It will thus be appreciated that in some embodiments bridging filaments may include electrets even though the bridging filaments may not necessarily contribute any significant filtering function.

Rigid, channel-framed, non-compressible, pleated air filter 1 may be used in any suitable environment or situation in which moving air, e.g. motivated by a mechanized fan or blower system, is desired to be filtered. Filter 1 thus may find use e.g. in HVAC (heating-ventilating-air-conditioning) systems, room air purifiers, automotive engine or cabin-air filtration applications, and so on. In particular embodiments, filter 1 is configured for use in forced-air HVAC systems.

List of Exemplary Embodiments

Embodiment 1 is a rigid, channel-framed, non-compressible, non-nestable, pleated air filter, comprising: a tightly-pleated air filter media comprised of a nonwoven fibrous web and with an upstream face and a downstream face and a generally rectangular perimeter with four major edges, wherein the tightly-pleated air filter media comprises a plurality of oppositely-facing pleats with a pleat direction and with a plurality of upstream pleat tips and upstream pleat valleys and downstream pleat tips and downstream pleat valleys, the tightly-pleated air filter media comprising a plurality of upstream linear bridging filaments that are at least substantially parallel to each other and are oriented at least substantially orthogonal to the pleat direction and are extrusion-bonded to at least some of the upstream pleat tips, the tightly-pleated air filter media further comprising a plurality of downstream linear bridging filaments that are at least generally parallel to each other and are oriented at least generally orthogonal to the pleat direction and are extrusion-bonded to at least some of the downstream upstream pleat tips, and, a channel frame comprising four major frame portions, with each major frame portion being mounted on one of the four major edges of the pleated air filter media.

Embodiment 2 is the pleated air filter of embodiment 1 wherein the upstream bridging filaments are at least essentially parallel to each other and comprise a center-to-center spacing between filaments of from about 4 mm to about 25 mm and wherein the upstream bridging filaments are at least essentially parallel to each other and comprise a center-to-center spacing between filaments of from about 4 mm to about 25 mm.

Embodiment 3 is the pleated air filter of any of embodiments 1-2 wherein the upstream pleat tips and the downstream pleat tips exhibit an average radius of curvature of at most about 1 mm. Embodiment 4 is the pleated air filter of any of embodiments 1-2 wherein the upstream pleat tips and the downstream pleat tips exhibit an average radius of curvature of at most about 0.5 mm. Embodiment 5 is the pleated air filter of any of embodiments 1-4 wherein the tightly-pleated air filter media comprises a pleat height of at least about 8 mm. Embodiment 6 is the pleated air filter of any of embodiments 1-4 wherein the tightly-pleated air filter media comprises a pleat height of at least about 12 mm. Embodiment 7 is the pleated air filter of any of embodiments 1-6 wherein the tightly-pleated air filter media comprises a ratio of pleat height to pleat radius of curvature of at least about six. Embodiment 8 is the pleated air filter of any of embodiments 1-6 wherein the tightly-pleated air filter media comprises a ratio of pleat height to pleat radius of curvature of at least about ten.

Embodiment 9 is the pleated air filter of any of embodiments 1-6 wherein the tightly-pleated air filter media comprises a pleat frequency of at least about 1.2 pleats per cm. Embodiment 10 is the pleated air filter of any of embodiments 1-9 wherein the upstream pleat tips and the downstream pleat tips are score-pleated tips that exhibit visible score lines.

Embodiment 11 is the pleated air filter of any of embodiments 1-10 wherein the air filter media comprises a Gurley Stiffness of at least about 175 mg. Embodiment 12 is the pleated air filter of any of embodiments 1-10 wherein the air filter media comprises a Gurley Stiffness of at least about 225 mg.

Embodiment 13 is the pleated air filter of any of embodiments 1-12 wherein the pleated air filter media comprises a nonwoven web comprising organic polymeric fibers at least some of which are of a composition that comprises electrets. Embodiment 14 is the pleated air filter of embodiment 13 wherein the bridging filaments are organic polymeric materials of the same electret-comprising composition as the organic polymeric fibers of the nonwoven web of the pleated air filter media.

Embodiment 15 is the pleated air filter of any of embodiments 1-14 wherein the pleated air filter media comprises a spun-bonded nonwoven web. Embodiment 16 is the pleated air filter of any of embodiments 1-14 wherein the pleated air filter media consists essentially of a spun-bonded nonwoven web that comprises organic polymeric fibers of a composition that comprises electrets. Embodiment 17 is the pleated air filter of embodiment 16 wherein the spun-bonded nonwoven web consists essentially of fibers of a polypropylene composition that comprises electrets, and wherein the upstream and downstream linear bridging filaments consist essentially of fibers of the same polypropylene composition that comprises electrets, as that of the fibers of the nonwoven web.

Embodiment 18 is the pleated air filter of any of embodiments 1-14 wherein the pleated air filter media comprises a blown-microfiber nonwoven web.

Embodiment 19 is the pleated air filter of any of embodiments 1-18 wherein at least some of the upstream linear bridging filaments are extrusion-bonded to at least some of the upstream pleat tips by fleur-de-lis bonds.

Embodiment 20 is the pleated air filter of any of embodiments 1-19 wherein neither the upstream face nor the downstream face of the pleated filter media comprises a reinforcing layer that is pleated along with the filter media and that is bonded thereto.

Embodiment 21 is the pleated air filter of any of embodiments 1-20 wherein the upstream bridging filaments and the downstream bridging filaments are compositionally compatible with the nonwoven fibrous web.

Embodiment 22 is the pleated air filter of any of embodiments 1-21 wherein the upstream bridging filaments and the downstream bridging filaments exhibit a melting point that is within about 10 degrees K of a melting point of the nonwoven fibrous web.

Embodiment 23 is a rigid, channel-framed, non-compressible, non-nestable, pleated air filter, comprising: a tightly-pleated air filter media comprised of a nonwoven fibrous web and with an upstream face and a downstream face and a generally rectangular perimeter with four major edges, wherein the tightly-pleated air filter media comprises a plurality of oppositely-facing pleats with a pleat direction and with a plurality of upstream pleat tips and upstream pleat valleys and downstream pleat tips and downstream pleat valleys, the tightly-pleated air filter media comprising a plurality of upstream linear bridging filaments that are at least substantially parallel to each other and are oriented at least substantially orthogonal to the pleat direction and are extrusion-bonded to at least some of the upstream pleat tips, and, a channel frame comprising four major frame portions, with each major frame portion being mounted on one of the four major edges of the pleated air filter media.

Embodiment 24 is the pleated air filter of embodiment 23 wherein the upstream bridging filaments exhibit the upstream bridging filament features of any of embodiments 2, 21, and 22. Embodiment 25 is the pleated air filter of embodiment 23 wherein the upstream pleats and upstream pleat tips exhibit the pleat features and/or pleat tip features of any of embodiments 3, 4, and 10. Embodiment 26 is the pleated air filter of embodiment 23 further comprising the features of any of embodiments 5-9 and 11-20.

Embodiment 27 is a method of filtering air, the method comprising: positioning the rigid, channel-framed, non-compressible, non-nestable, pleated air filter of any of embodiments 2-26 in an HVAC system; and, operating the HVAC system so that moving air is pulled through the pleated filter media of the filter so as to filter the air pulled therethrough.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document incorporated by reference herein, this specification as written will control.

What is claimed is:

1. A rigid, channel-framed, non-compressible, non-nestable, pleated air filter, consisting essentially of:
a tightly-pleated air filter media with an upstream face and a downstream face and a generally rectangular perimeter with four major edges,
wherein the tightly-pleated air filter media has a plurality of oppositely-facing pleats with a pleat direction and with a plurality of upstream pleat tips and upstream pleat valleys and downstream pleat tips and downstream pleat valleys,
the tightly-pleated air filter media bearing a plurality of upstream linear bridging filaments that are all parallel to each other and are all oriented orthogonal to the pleat direction and are all extrusion-bonded to at least some of the upstream pleat tips,
the tightly-pleated air filter media further bearing a plurality of downstream linear bridging filaments that are all parallel to each other and are all oriented orthogonal to the pleat direction and are all extrusion-bonded to at least some of the downstream upstream pleat tips,
and,
a channel frame comprising four major frame portions, with each major frame portion being mounted on one of the four major edges of the pleated air filter media.

2. The pleated air filter of claim 1 wherein the upstream bridging filaments comprise a center-to-center spacing between filaments of from about 4 mm to about 25 mm and wherein the downstream bridging filaments comprise a center-to-center spacing between filaments of from about 4 mm to about 25 mm.

3. The pleated air filter of claim 1 wherein the upstream pleat tips and the downstream pleat tips exhibit an average radius of curvature of at most about 0.5 mm.

4. The pleated air filter of claim 1 wherein the tightly-pleated air filter media comprises a pleat height of at least about 8 mm.

5. The pleated air filter of claim 1 wherein the tightly-pleated air filter media comprises a pleat height of at least about 12 mm.

6. The pleated air filter of claim 1 wherein the tightly-pleated air filter media comprises a ratio of pleat height to pleat radius of curvature of at least about ten.

7. The pleated air filter of claim 1 wherein the tightly-pleated air filter media comprises a pleat frequency of at least about 1.2 pleats per cm.

8. The pleated air filter of claim 1 wherein the upstream pleat tips and the downstream pleat tips are score-pleated tips that exhibit visible score lines.

9. The pleated air filter of claim 1 wherein the air filter media comprises a Gurley Stiffness of at least about 225 mg.

10. The pleated air filter of claim 1 wherein the pleated air filter media is a blown-microfiber nonwoven web.

11. The pleated air filter of claim 1 wherein at least some of the upstream linear bridging filaments are extrusion-bonded to at least some of the upstream pleat tips by fleur-de-lis bonds.

12. The pleated air filter of claim 1 wherein the upstream bridging filaments and the downstream bridging filaments exhibit a melting point that is within about 10 degrees K of a melting point of a nonwoven fibrous web of the pleated filter media.

13. A method of filtering air, the method comprising:
positioning the rigid, channel-framed, non-compressible, non-nestable, pleated air filter of claim 1 in an HVAC system; and, operating the HVAC system so that moving air is pulled through the pleated filter media of the filter so as to filter the air pulled therethrough.

14. A rigid, channel-framed, non-compressible, non-nestable, pleated air filter, comprising:
a tightly-pleated air filter media comprised of a nonwoven fibrous web and with an upstream face and a downstream face and a generally rectangular perimeter with four major edges,
wherein the tightly-pleated air filter media comprises a plurality of oppositely-facing pleats with a pleat direction and with a plurality of upstream pleat tips and upstream pleat valleys and downstream pleat tips and downstream pleat valleys,
the tightly-pleated air filter media bearing a plurality of upstream linear bridging filaments that are all at least essentially parallel to each other and are all oriented at least essentially orthogonal to the pleat direction and are extrusion-bonded to at least some of the upstream pleat tips,
the tightly-pleated air filter media further bearing a plurality of downstream linear bridging filaments that are all at least essentially parallel to each other and are all oriented at least essentially orthogonal to the pleat direction and are extrusion-bonded to at least some of the downstream upstream pleat tips,
and,
a channel frame comprising four major frame portions, with each major frame portion being mounted on one of the four major edges of the pleated air filter media;
and wherein the pleated air filter media comprises a nonwoven web comprising organic polymeric fibers at least some of which are of a composition that comprises electrets, and further wherein the bridging filaments are organic polymeric materials of the same electret-comprising composition as the organic polymeric fibers of the nonwoven web of the pleated air filter media.

15. The pleated air filter of claim 14, wherein the pleated air filter media comprises a nonwoven web that is a blown-microfiber web.

16. The pleated air filter of claim 14, wherein the pleated air filter media comprises a nonwoven web that is a spun-bonded web.

17. The pleated air filter of claim 14 wherein the upstream pleat tips and the downstream pleat tips are score-pleated tips that exhibit visible score lines.

18. The pleated air filter of claim 14 wherein the air filter media comprises a Gurley Stiffness of at least about 225 mg.

19. A rigid, channel-framed, non-compressible, non-nestable, pleated air filter, comprising:
a tightly-pleated air filter media comprised of a nonwoven fibrous web and with an upstream face and a downstream face and a generally rectangular perimeter with four major edges,
wherein the tightly-pleated air filter media comprises a plurality of oppositely-facing pleats with a pleat direction and with a plurality of upstream pleat tips and upstream pleat valleys and downstream pleat tips and downstream pleat valleys, the tightly-pleated air filter media bearing a plurality of upstream linear bridging filaments that are all at least essentially parallel to each other and are all oriented at least essentially orthogonal to the pleat direction and are extrusion-bonded to at least some of the upstream pleat tips, the tightly-pleated air filter media further bearing a plurality of downstream linear bridging filaments that are all at least essentially parallel to each other and are all oriented at least essentially orthogonal to the pleat direction and are extrusion-bonded to at least some of the downstream upstream pleat tips, and, a channel frame comprising four major frame portions, with each major frame portion being mounted on one of the four major edges of the pleated air filter media;

and wherein the pleated air filter media consists essentially of a spun-bonded nonwoven web that consists essentially of organic polymeric fibers of a polypropylene composition that comprises electrets and wherein the upstream and downstream linear bridging filaments consist essentially of fibers of the same polypropylene composition that comprises electrets, as that of the fibers of the nonwoven web.

\* \* \* \* \*